V. CZERWENY.
DIPPING APPARATUS FOR MATCH MAKING MACHINES.
APPLICATION FILED OCT. 15, 1912.
1,091,915.
Patented Mar. 31, 1914.
2 SHEETS—SHEET 1.
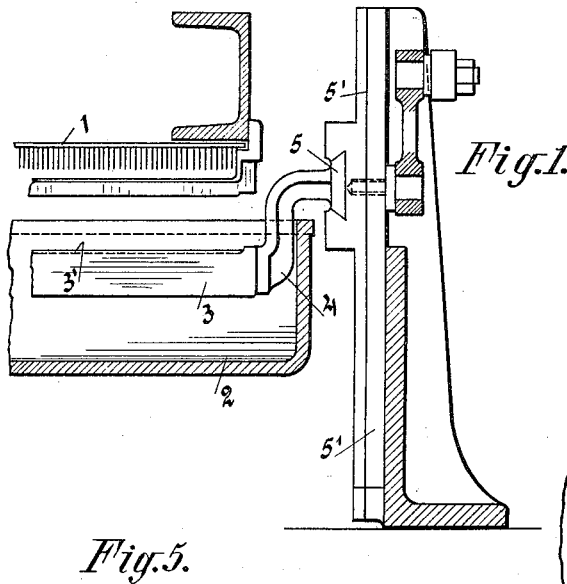
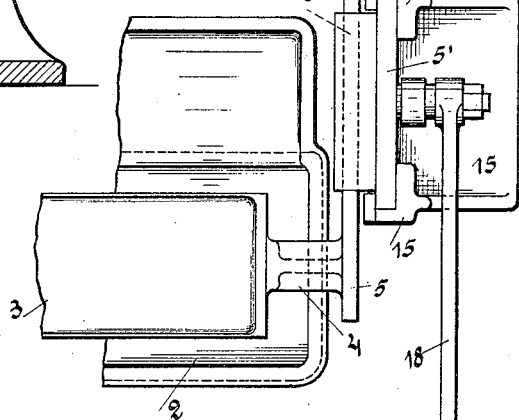
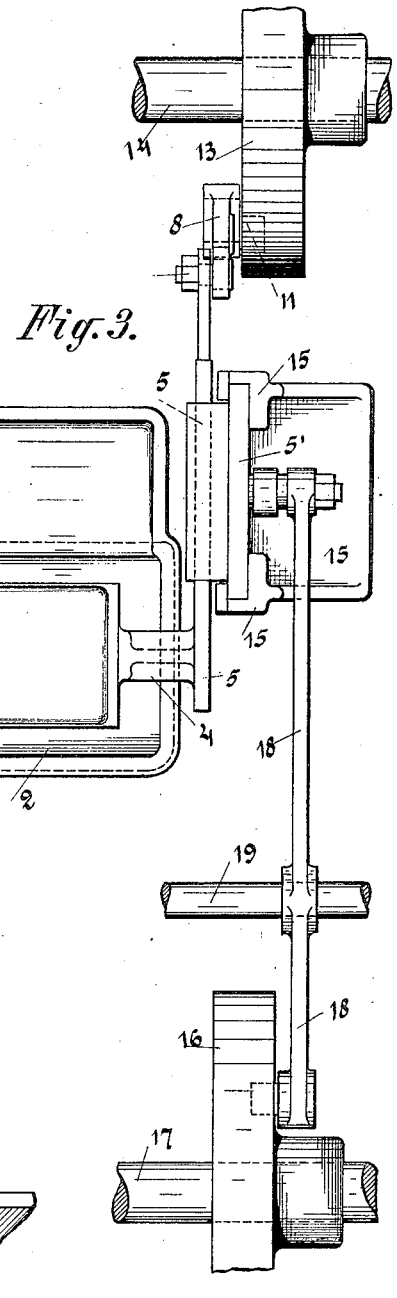
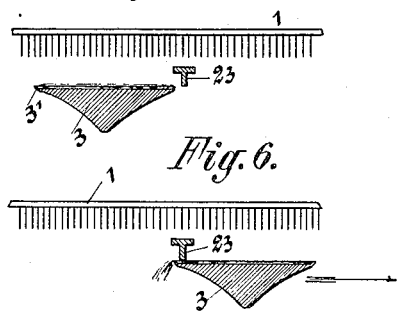
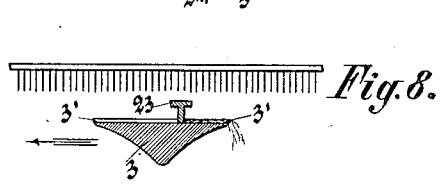
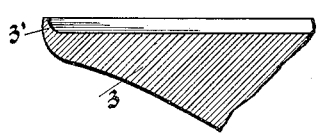
Witnesses:
E. C. Ryder
E. B. Schweder
Inventor:
Viktor Czerweny

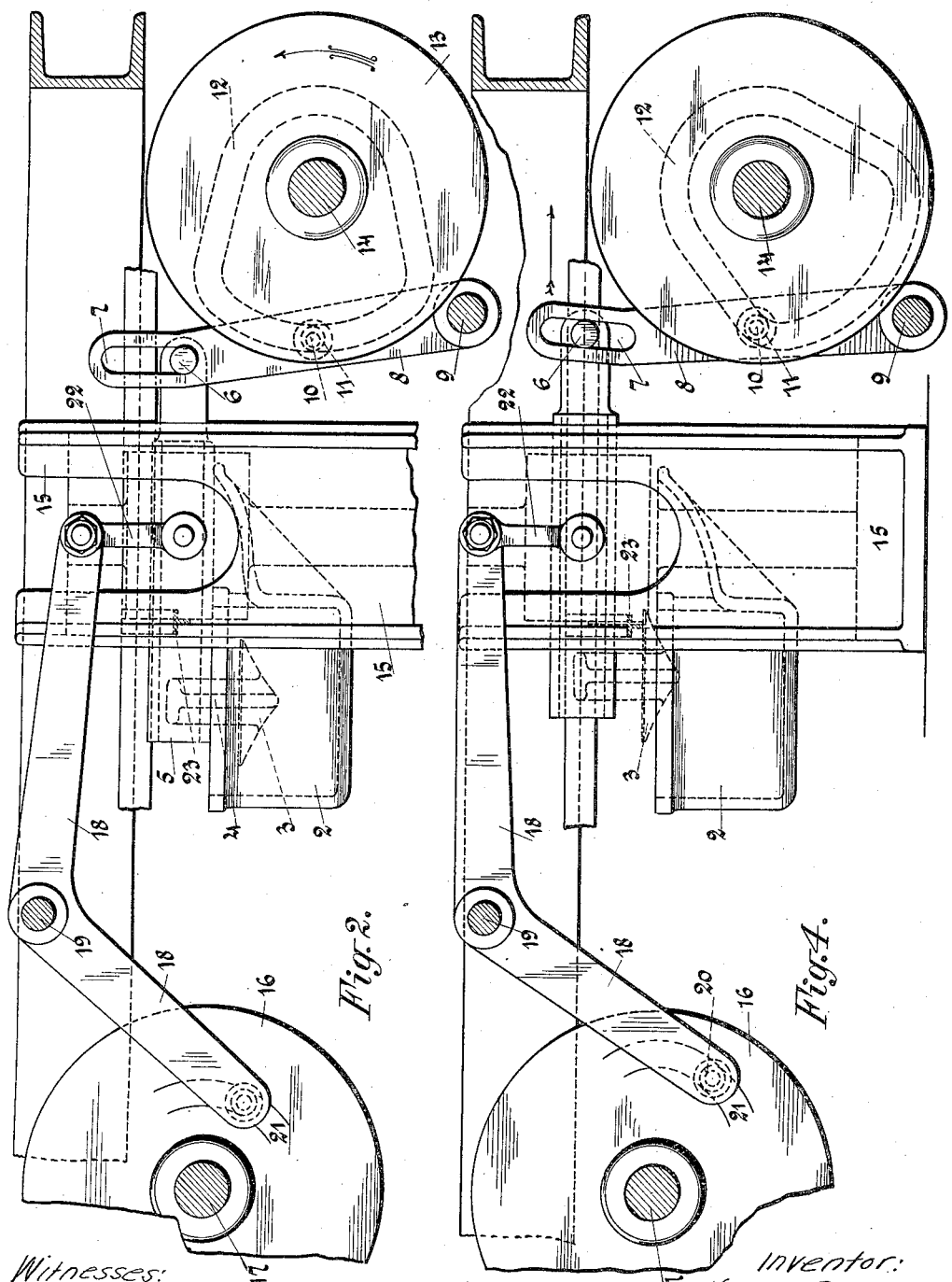

UNITED STATES PATENT OFFICE.

VIKTOR CZERWENY, OF DEUTSCHLANDSBERG, NEAR GRATZ, AUSTRIA-HUNGARY.

DIPPING APPARATUS FOR MATCH-MAKING MACHINES.

1,091,915. Specification of Letters Patent. Patented Mar. 31, 1914.

Application filed October 15, 1912. Serial No. 725,778.

*To all whom it may concern:*

Be it known that I, VIKTOR CZERWENY, subject of the Emperor of Austria-Hungary, residing at Deutschlandsberg, near Gratz, Styria, Austria-Hungary, have invented certain new and useful Improvements in Dipping Apparatus for Match-Making Machines, of which the following is a specification.

The apparatus forming the subject matter of this invention has for its object to mechanically and uniformly apply the igniting composition to the match splints. This object is attained by the hereinafter described constructions, reference being had to the accompanying drawings.

Figure 1 is a longitudinal section through the dipping apparatus. Fig. 2 is a side elevation and Fig. 3 a plan thereof. Fig. 4 is the same side elevation as Fig. 2 but in a different phase of the operation. Figs. 5, 6, 7 and 8 represent the relative position of the 2 main parts of the mechanism, the dipping bar and the scraping rail, in different phases of the operation, the other parts of the apparatus being omitted for sake of simplicity. Fig. 9 shows a part of the dipping bar on a larger scale.

The match splints are inserted in the holes of plates or bars 1, hereinafter designated match carriers, in the known manner, which is therefore not described herein, and are conveyed by a conveyer over the dipping apparatus, provision being made by a suitable construction of the conveyer for the match carriers to remain stationary with one or several rows of splints a sufficiently long time over the dipping apparatus in order to apply the igniting composition to the splints. It may be stated that this conveyer does not form the subject matter of this invention.

The dipping bar 3 is provided over the vat 2 containing the igniting composition in such a manner that it can dip into the vat and below the level of the igniting composition. The surface of the bar 3 is provided with 2 sharp edges $3^1$, Fig. 9, whereby the igniting composition applied to the dipping bar is prevented from running off the surface of the dipping bar. A pan-like or shallow depression is thereby formed in the dipping bar, such depression being filled with composition when the bar is immersed in the vat. The dipping bar is carried in the slide block $5^1$ by means of a bracket 4 and a slide 5 in such a manner that it can be moved to and fro horizontally. This horizontal movement is imparted to the dipping bar in the following manner: At one end of the slide 5 is secured a bolt 6, which engages in the slot 7 of a lever 8. The lever 8 is pivoted at 9 to the machine frame or foundation. It receives a swinging or rocking movement through the medium of the bolt 10 with the cam roller 11 sliding in the groove 12 of the cam disk 13, when the latter rotates on the shaft 14 in the direction of the arrow, Fig. 2. The shaft 14 is mounted on the machine frame and receives in a suitable manner a uniformly rotating movement. The effect is thus attained that the slide 5 is moved once to the right and again to the left. The cam 12 is formed in such a manner that the slide 5 remains stationary a certain time in each of the two end positions.

The slide block $5^1$ is adapted to move vertically up and down in the guide 15. It receives this vertical movement through the medium of the two-armed lever 18 from the cam disk 16, which is keyed on to the rotating shaft 17 mounted on the machine frame. The said lever has a fixed fulcrum at 19 and receives a rocking movement from the cam roller 20, which moves in the groove 21 of the cam disk 16, such rocking movement being transmitted as a vertical upward and downward movement to the slide block $5^1$ by the lever 18 and a guide rod 22. The vertical movement of the slide block $5^1$ is also transmitted to the dipping bar 3 by the slide 5 mounted in the slide block $5^1$. The dipping bar 3 thus receives 2 movements: a horizontal, reciprocating movement from the cam disk 13 and a vertical, upward and downward movement from the cam disk 16. A rigid immovable scraping rail 23 is screwed on to the machine frame; by a suitable construction of the cam grooves 12 and 21, the cam disks 13 and 16, suitable vertical and horizontal movements can be imparted to the dipping bar 3 within the lifting limits. The said cams are so constructed that the dipping bar makes the following movements: In the initial position, Figs. 1 and 2, the dipping bar is immersed below the level of the composition in the vat 2. In the second phase of the movement, the dipping bar is pushed out of the vat vertically so that the uppermost edges 3¹ of the dipping bar are on the same level as the lower edge 24 of the scraping rail 23. The dipping bar is thus covered with a layer of composition, which however does not form a level surface owing to the viscosity of the composition, see Fig. 5. In the next phase of movement, the dipping bar moves horizontally to the right without changing its level. It therefore sweeps with the edges 3¹ immediately below the lower edge 24 of the scraping rail 23, so that all surplus composition is scraped off and falls back into the vat, see Figs. 4 and 6. The layer of composition on the dipping bar is thus completely leveled, as is necessary for a uniform formation of the head. The horizontal movement to the right only stops when the left edges 3¹ of the dipping bar 3 have completely passed beneath the edge 24 of the scraping rail. In the fourth phase of movement, the dipping bar is moved vertically from below to the tips of the matches, so that these dip into the layer of composition and the formation of the heads takes place. By a suitable construction of the vertical movement cam 21, the effect can be attained that the match tips dip repeatedly and at different depths in the layer of composition, which is most advisable for the good formation of the match heads. Fig. 7 shows how the match head is formed. In the next phase of movement, the dipping bar sinks vertically until the edges 3¹ of the dipping bar are again on the same level as the lower edge 24 of the scraping rail. The dipping bar moves on this level to the left until the left tip 3¹ has passed beneath the edge 24. Immediately after this has taken place, the dipping bar again rises a little until the edge 24 bears on the bottom of the pan-like or shallow depression of the dipping bar 3. In this position, the dipping bar moves horizontally to the left, the scraping rail 23 removing all igniting composition from the dipping bar. This composition passes over the right edge 3¹ of the dipping bar into the vat again, see Fig. 8. At the moment when the right edge 3¹ is about to come in contact with the scraping rail 23 during the movement of the dipping bar to the left, the dipping bar sinks a little, so that the edge 3¹ passes beneath the edge 24 without coming in contact therewith. The dipping bar has thus reached the position of Fig. 5 and now sinks vertically again into the vat, whereupon the whole described operation is repeated. The essence of this operation and that which actually forms the contents of the invention is that by the sole movement of the dipping bar in combination with a stationary scraping rail, a fresh layer of composition is applied to the dipping bar, the layer of composition is leveled, the heads of the matches are formed, the layer of the composition is again removed from the dipping bar and the dipping bar is immersed in the vat. The means for producing this movement of the dipping bar are set forth in the specification, the movement being produced by 2 cam disks, 2 levers and 2 slides disposed vertically with respect to each other. It is however obvious that other means and combinations can be employed for producing the described movement.

What I claim as new is as follows:

1. Dipping apparatus for match making machines comprising a composition vat, a horizontally and vertically movable dipping bar, and a fixed scraping rail, in combination with mechanism for moving the dipping bar vertically into and out of the composition vat to load it with composition, and for subsequently moving the dipping bar horizontally beneath the scraping rail to level the surface of the composition.

2. In a match making machine, the combination of a movable dipping bar 3 and a stationary scraping rail 23 and the means necessary for producing a vertical and horizontal movement of the dipping bar within certain limits, so that the dipping bar will dip in the composition vat below the level of the composition, uniformly level the layer of igniting composition to a certain thickness by passing the stationary scraping rail 23, and, after the splints have been dipped in the composition, completely scrape off the used composition on the stationary scraping rail and dip again in the composition vat below the level of the composition.

3. Dipping apparatus for match making machines comprising a composition vat, a horizontally and vertically movable dipping bar, and a fixed scraping rail, in combination with mechanism for moving the dipping bar vertically into and out of the composition vat to load it with composition, and for subsequently moving the dipping bar horizontally beneath the scraping rail to level the surface of the composition and then vertically to apply the composition to the splints.

4. In a match making machine, the combination of a movable dipping bar, a stationary scraping rail and the means necessary for the horizontal and vertical movement of the dipping bar; the dipping bar for removing the already used composition contained thereon being moved beneath the stationary scraping rail and after the one edge 3¹ of the dipping bar 3 is moved beneath the lower edge 24 of the scraping rail 23, the dipping bar being raised to the height of the edges 3 and subsequently, when the other edge 3 comes in contact with the lower edge 24 of the scraping rail, the dipping bar being lowered to the same extent, so that the stationary scraping rail touches, during this movement, the bottom of the pan-like depression of the dipping bar 3, whereby the composition contained in this pan-like depression is removed.

5. Dipping apparatus for match making machines including a movable dipping bar and a stationary scraping rail, in combination with mechanism for moving the dipping bar filled with composition beneath the scraping rail to level the surface of the composition thereon, and, after the match splints have been dipped in the composition, for moving the dipping bar beneath and in closer proximity to the scraping rail to scrape the composition from the bar.

6. Dipping apparatus for match making machines including a relatively movable dipping bar and scraping rail, in combination with mechanism for imparting relative movement to the said parts to first level the composition on the dipping bar by means of the scraping rail, and subsequently, after the splints have been dipped in the composition, to scrape the remaining composition from the dipping bar by means of the scraping rail.

In testimony whereof I affix my signature in presence of two witnesses.

VIKTOR CZERWENY.

Witnesses:
 SIEGFRIED NEUTRA,
 AUGUST FUGGER.

Copies of this patent may be obtained for five cents each, by addressing the "Commissioner of Patents, Washington, D. C."